DAVID CROWELL, Jr.
Improvement in Devices for Hanging Looking-Glasses and Pictures.
No. 115,713.                  Patented June 6, 1871.
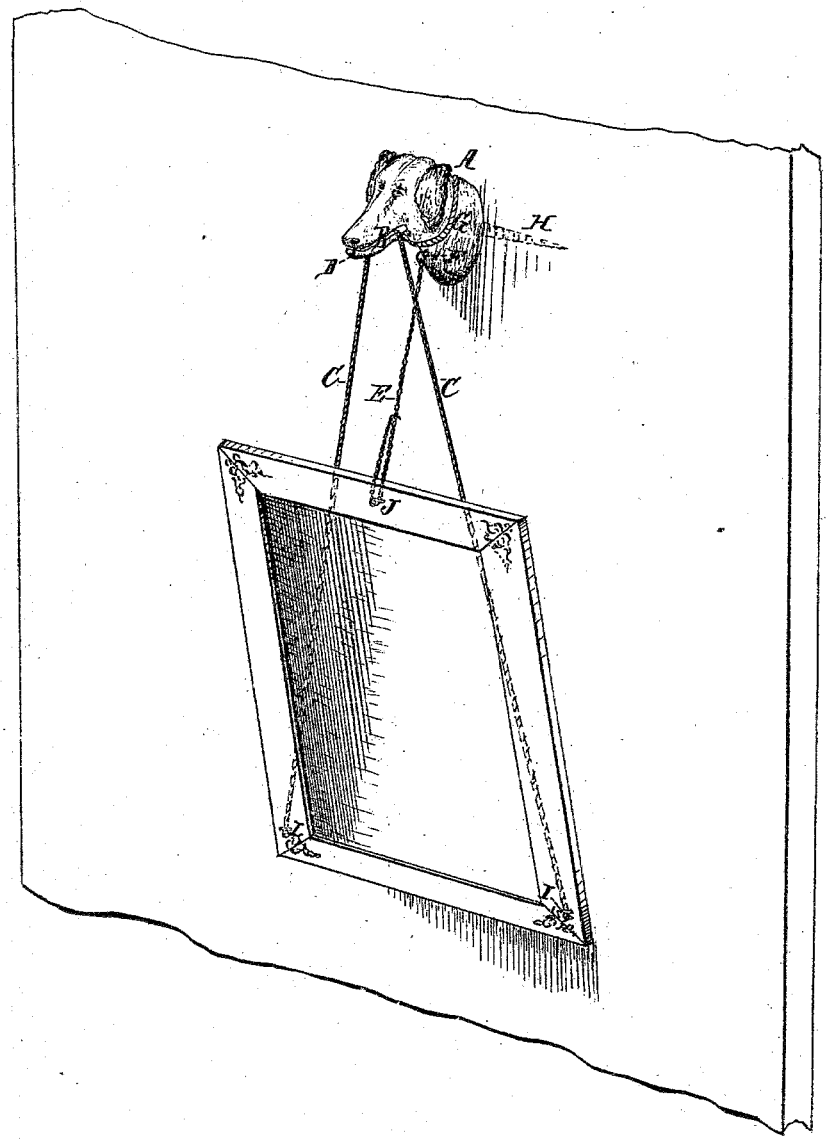

UNITED STATES PATENT OFFICE.

DAVID CROWELL, JR., OF YARMOUTH PORT, MASSACHUSETTS.

IMPROVEMENT IN DEVICES FOR HANGING LOOKING-GLASSES AND PICTURES.

Specification forming part of Letters Patent No. 115,713, dated June 6, 1871.

I, DAVID CROWELL, Jr., of the town of Yarmouth Port, the county of Barnstable, in the State of Massachusetts, have invented a new and useful invention for Hanging Looking-Glasses or the Frames, called a Glass or Picture-Hook, of which the following is a specification:

My invention consists of the representation of a dog or lion's head with screw on the back part to screw into the wall or place you want your glass or picture, and is represented substantially as follows, and is shown in the drawing herewith annexed.

A represents the head, and is made out of brass, iron, or any other kind of metal. C C represent the cord by which the frame is hung, going around the dog's neck, as shown by letter G, and passing through his mouth, as shown by letter D. B represents the mouth of dog or lion, partly open. C C also represent the cord fastened to the glass, as represented by the letters I I on each lower corner of the frame of glass or picture. F represents a ring fastened in the neck of the dog or lion, to which is fastened a small chain with a hook on the end, and represented by letter E, and passing through ring-screw, as represented by letter J, on each side of the back part of the frame, or in the center of the frame, by which the upper portion of the glass or frame can be raised or lowered, to suit the convenience of any person, by the hook, either up or down. Letter H represents the screw in the back part of the head or neck, by which it is substantially fastened to the desired place.

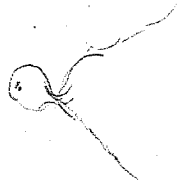

What I claim as my improvement in a device for hanging frames, &c., is—

The device shown, a dog's head, A, to be attached by screw H, in combination with cords C C, and mouth D, chain E, hooks J I I, as shown and described.

DAVID CROWELL, JR.

Witnesses:
   JEROME AMOS,
   F. W. HOWARD.